(12) United States Patent
Mariotti

(10) Patent No.: US 8,612,315 B2
(45) Date of Patent: Dec. 17, 2013

(54) SYSTEMS AND METHODS FOR REMOTE VALIDATION

(75) Inventor: Andrea Mariotti, Menlo Park, CA (US)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/008,601

(22) Filed: Jan. 18, 2011

(65) Prior Publication Data

US 2011/0112978 A1    May 12, 2011

Related U.S. Application Data

(62) Division of application No. 10/985,779, filed on Nov. 9, 2004, now Pat. No. 7,890,388.

(51) Int. Cl.
*G06Q 10/00* (2012.01)

(52) U.S. Cl.
USPC .......................................................... 705/28

(58) Field of Classification Search
USPC .......................................................... 705/28
See application file for complete search history.

(56) References Cited

U.S. PATENT DOCUMENTS

| | | | | |
|---|---|---|---|---|
| 7,284,699 B2 * | 10/2007 | Hamilton | ...................... | 235/385 |
| 7,349,854 B2 * | 3/2008 | Frederick | ...................... | 705/330 |
| 7,407,098 B2 * | 8/2008 | Jouvin et al. | ................... | 235/384 |
| 7,421,311 B2 * | 9/2008 | Perez et al. | .................... | 700/213 |
| 7,498,938 B2 * | 3/2009 | Ulrich | ...................... | 340/539.13 |
| 2002/0123917 A1 * | 9/2002 | Wolfe | ................................ | 705/7 |
| 2003/0227392 A1 * | 12/2003 | Ebert et al. | ............... | 340/825.49 |
| 2004/0004119 A1 * | 1/2004 | Baldassari et al. | ............ | 235/384 |
| 2004/0060976 A1 * | 4/2004 | Blazey et al. | ................. | 235/375 |
| 2005/0038758 A1 * | 2/2005 | Hilbush et al. | ................ | 705/402 |
| 2005/0187836 A1 * | 8/2005 | Wolfe | ............................. | 705/28 |
| 2008/0221913 A1 * | 9/2008 | Cook et al. | ........................ | 705/1 |

OTHER PUBLICATIONS

UPS Publication, http://www.ups.com, Sep. 28, 2003.
UPS Publication, http://www.ups.com, Jan. 22, 2002.

* cited by examiner

*Primary Examiner* — Seye Iwarere
(74) *Attorney, Agent, or Firm* — Finnegan, Henderson, Farabow, Garrett & Dunner LLP

(57) ABSTRACT

Systems and methods consistent with embodiments of the present invention provide for a method for remote data validation of shipment information. In some embodiments consistent with the present invention shipment information including at least one item identifier of an item in the shipment and at least one entity identifier of an entity associated with the item is captured by a remote unit and sent to a dispatcher with a request for validation. Entity identifiers in the received validation request are used to identify validators that are targets of dispatcher generated validation requests. Validators retrieve additional shipment information using item identifiers in the validation request received from the dispatcher and return a response based on degree to which information in the received request corresponds to stored information. In some embodiments consistent with the present invention, the dispatcher assimilates the received responses and relays the assimilated response to the remote unit.

20 Claims, 4 Drawing Sheets

SYSTEMS AND METHODS FOR REMOTE VALIDATION

RELATED APPLICATION

This application is a Division of U.S. Ser. No. 10/985,779, filed Nov. 9, 2004 now U.S. Pat. No. 7,890,388, titled "Systems and Methods for Remote Validation", by inventor Andrea Mariotti, which is incorporated herein by reference in its entirety.

FIELD OF THE INVENTION

The present invention relates to the field of physical distribution management and in particular, to the remote validation of shipment information.

DESCRIPTION OF RELATED ART

The shipment of goods from a manufacturer or retailer to a consumer may involve several shipping agents. A primary shipping agent or shipping company may pick up goods at a manufacturer site, which may then be handed off to multiple third parties called carriers. Carriers travel with a shipment for all or part of its journey to a final destination. A document, termed a bill of lading, describes each consignment of goods that is accepted by a carrier. Information derived from the bills of lading may be combined into a manifest that describes all the cargo carried on board a particular vehicle or vector ("vector"). The manifest may be used by law enforcement agencies to ensure that the cargo in the vector matches information on the manifest. Law enforcement agencies will often also check directly with the individual entities involved with the shipment to validate the shipment details described in the manifest such as the origin, destination, and nature of the goods and to get additional information that may not be provided in the manifest. The need to check directly with the individual entities arises because each entity involved in the transportation of the shipment guards customer and operational information zealously from other entities involved in the process. Thus, the manifest contains less information than a law enforcement agency would typically require and often requires additional verification before the shipment may be cleared. For example, a law enforcement agency may want to verify and/or account for any deviations from the typical route used by a carrier to ensure that a shipment is not being diverted for unlawful purposes. Currently, such verification is done through the use of traditional communication means such as over the telephone or over police radio. The law enforcement agency official contacts an authorized representative at each of the various individual entities. The authorized representative can then respond to the official's request. The use of such traditional verification mechanisms including the need to interact with the representatives of multiple entities creates delays, decreases efficiency, and increases costs for all parties involved. Therefore, there is a need for a method to allow reliable efficient remote validation of shipment information while preserving the confidentiality of proprietary data that is released for law enforcement purposes.

Reliable efficient remote validation of shipment information would result, inter alia, in enhanced transportation security and public safety, reduced wait times at inspection points due to faster processing by law-enforcement agencies, reduced lag times between order placement and fulfillment, increased utilization of vectors and greater predictability of shipment times and costs.

SUMMARY OF THE INVENTION

In accordance with the present invention, systems and methods for remote validation are presented.

In some methods for remote data validation, shipment data is encoded and recorded on a document or other media. In some embodiments consistent with the present invention, recorded shipment data and other information about the shipment may be captured at a remote location. A portion of the captured information may be transmitted to individual entities associated with the shipment. In some embodiments consistent with the present invention the shipment information may be captured and transmitted electronically. Information received by the individual entities is compared with information about the shipment that may be stored in their respective individual repositories and a response is returned to the remote requestor based on the results of the comparison.

These and other embodiments are further explained below with respect to the following figures.

DETAILED DESCRIPTION

In accordance with the present invention, methods and systems are provided for remote data validation. Recorded shipment information along with other information that is captured at a remote inspection point is sent to a dispatcher with a request for validation. In some embodiments consistent with the present invention, information received by the dispatcher is parsed and multiple validation requests are generated to individual entities associated with the information received by the dispatcher. In some embodiments consistent with the present invention, each individual entity retrieves information associated with the shipment in response to the received validation request. A code sequence is returned to the dispatcher by each individual entity based on the degree to which information in the received request corresponds to stored information. In some embodiments consistent with the present invention, the dispatcher assimilates the received code sequences and relays the assimilated code sequence to the remote unit.

Figure 1:
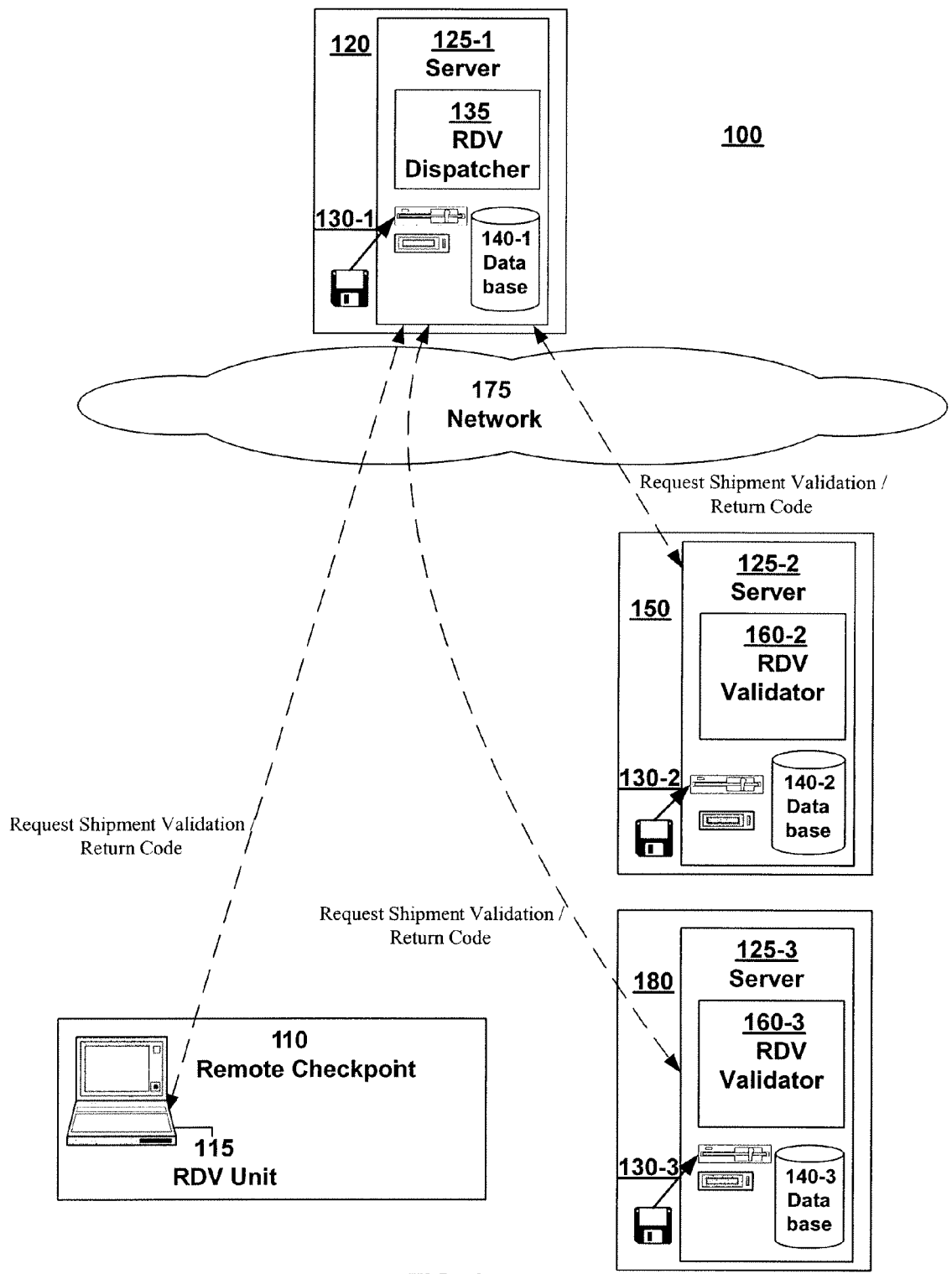
FIG. 1 shows a block diagram of a remote data validation system consistent with some embodiments of the invention.

FIG. 1 illustrates an exemplary system 100 for performing remote data validation according to the embodiments of the present invention. In the figures, elements with similar functions are prefixed with the same numeric identifier, and individual instances are identified with a hyphenated ordinal suffix. As shown in FIG. 1, system 100 consists of a Remote Data Validation ("RDV") Unit 115 that may be deployed at Remote Checkpoint 110. RDV Unit 115 may be, for example, a laptop, tablet computer, a handheld device, or other device capable of exchanging information with server 125-1 over network 175. In some embodiments, functions of RDV Unit 115 may be provided by partly or entirely by software that configures existing hardware devices capable of exchanging information with server 125-1 over network 175. The exchange of information over network 175 may be accomplished through a wired or a wireless connection using conventional communication protocols and/or data port interfaces. In general, any communication channel that allows transmission of data between RDV Unit 115 and servers 125-1, 125-2, and 125-3 including network channels and/or transfer of data between machines on fixed storage media may be used to effect the exchange of information. In some embodiments consistent with the present invention, information sent over network 175 may be encrypted to ensure the security of the data being transmitted.

RDV Dispatcher 135 runs on Server 125-1 and can interact with Database 140-1. In some embodiments consistent with the present invention Server 125-1 may be situated, for example, at the site of Law Enforcement Agency site 120. In general, servers running RDV Dispatchers such as the exemplary Server 125-1 shown in FIG. 1 may be deployed at various locations in a manner to facilitate communications with RDV Units and with other elements of the system over network 175, in accordance with some embodiments of the invention. For example, RDV Dispatchers could be deployed close to border crossing points, inspection stations, or around areas designated for heightened scrutiny by law enforcement agencies in a manner to facilitate communications with the RDV Units carried by law enforcement officials. RDV Units may be pre-programmed with the information needed to communicate with RDV Dispatchers, or RDV Dispatcher information may be obtained dynamically in response to a request sent out by the RDV Unit. Database 140-1 may reside on Server 125-1, which also contains removable media drives 130-1. In general, Database 140-1 may reside on any other server or computer that is connected through network 175 to a server running the RDV Dispatcher, although for performance and efficiency reasons it may be more advantageous to have both RDV Dispatcher 135 reside on a single server. Removable media drives 130-1, 130-2 ... 130-n may include, for example, 3.5 inch floppy drives, CD-ROM drives, DVD ROM drives, CD±RW or DVD±RW drives, USB flash drives and/or any other removable media drives consistent with embodiments of the present invention.

Server 125-1 is also connected by network 175 to Server 125-2. In some embodiments consistent with the present invention Server 125-2 may be situated, for example, at the site of Vendor 150. In general, servers running RDV Validators such as the exemplary Server 125-2 shown in FIG. 1 may be deployed at the locations of various entities associated with shipments, in a manner to facilitate communications over network 175 with RDV Dispatchers and with other elements of the system, in accordance with some embodiments of the invention. Database 140-2 may reside on Server 125-2, which also contains removable media drives 130-2. RDV Validator 160-2 runs on Server 125-2 and can interact with Database 140-2.

Server 125-3, containing removable media drives 130-3, is also connected by network 175 to Server 125-1. In some embodiments consistent with the present invention Server 125-3 may be situated, for example, at the site of Shipping Company 180. Exemplary RDV Validator 160-3 may run on Server 125-3 and interact with exemplary Database 140-3. Database 140-3 may also be resident on server 125-3.

In general, an exemplary Database 140-n may reside on any server or computer that is able to communicate with its corresponding RDV Validator 160-n, although for performance and efficiency reasons it may be more advantageous to have both the exemplary database 140-n and RDV Validator 160-n reside on a single server.

System 100 may also include other servers (not shown) that are connected to network 175. These servers may have removable media drives and databases and run the RDV Dispatcher or the RDV Validator, as appropriate. Such servers may be located at various entities associated with shipment validation. System 100 may also include multiple RDV Units that may be deployed at various inspection points. In some embodiments consistent with the present invention, some or all of the RDV Units and associated inspection points may be mobile.

In some embodiments consistent with the present invention, shipment data recorded on a manifest document or on other media is captured or entered into RDV Unit 115. In some embodiments consistent with the present invention, data may be captured directly by RDV Unit 115, for example, from shipment information encoded in a bar code or other machine-readable form on the manifest. In some embodiments additional information needed about the shipment and not provided by the manifest may also be entered by an operator into RDV Unit 115. For example, information about the present physical location of a shipment, such as a highway number and mile stop may be entered into the RDV Unit for transmission to an RDV Dispatcher. This physical location information may then be communicated to an RDV Validator by the RDV Dispatcher, for validation against route information that may be available, for example, in a trucking company database. Shipment information, including at least one "item identifier" identifying an item in the shipment and at least one entity associated with the item, needing validation is sent from RDV Unit 115 to Server 125-1 over network 175.

In accordance with embodiments of the present invention, shipment information received by server 125-1 from RDV Unit 115 may be parsed by RDV Dispatcher 135, to identify entities associated with the shipment and/or to separate information in the received request into data fields. Exemplary entities associated with a shipment could include the manufacturer, or shipping company, or government agencies from which clearances, such as export or import licenses, or licenses to carry or transport hazardous materials, may be needed. RDV Dispatcher 135 may also query database 140-1 for missing information regarding entities associated with the shipment information. For example, information such as the network address of Servers 125-2 and 125-3 associated with Vendor 150 and Shipping Company 180 respectively could be retrieved from database 140-1. In some embodiments consistent with the present invention, a validation request containing at least one field with information identifying an item in the shipment based on information received by server 125-1 and/or gathered from database 140-1, may be sent to servers 125-2 and 125-3 by RDV Dispatcher 135.

Information received by Vendor 150 on Server 125-2 from RDV Dispatcher 135 is parsed by RDV Validator 160-2 to generate queries to database 140-2, which contains shipment-related information including information that may not be available on the manifest carried by the vector. Data retrieved from database 140-2 is compared with information in the validation request from Server 125-1 and a response is generated. For example, the generated response may indicate that some of the information in the RDV Validator database matches the data in the validation request and/or that some information in the RDV Validator database does not match information in the validation request and/or that RDV Validator database contains insufficient information to make a comparison. In some embodiments consistent with the present invention the response may be encoded in the form of a Return Code, which is sent to RDV Dispatcher 135 on Server 125-1 over network 175. Similarly, information contained in the validation request received by Shipping Company 180 on Server 125-3 is processed by RDV Validator 160-3 using information from database 140-3. A response to the validation request is generated by RDV Validator 160-3 based on shipment information retrieved from database 140-3 using the item identifier(s) and sent to RDV Dispatcher on Server 125-1 over network 175. It should be noted that entities associated with the shipment may also include, for example, government agencies from which export or import licenses, agricultural, health or safety clearances may need to be obtained. Accordingly, RDV Validators may be deployed at such agencies in a manner consistent with embodiments of the invention, to respond to requests originating from RDV Units carried by law enforcement officials performing actual inspections and to ensure that needed clearances and/or licenses have been obtained.

RDV Dispatcher 135 combines the responses received from the RDV Validator Modules 160-2 and 160-3, and sends the combined response to the RDV Unit 115. RDV Unit 115 can then display the combined response to the operator.

Figure 2:
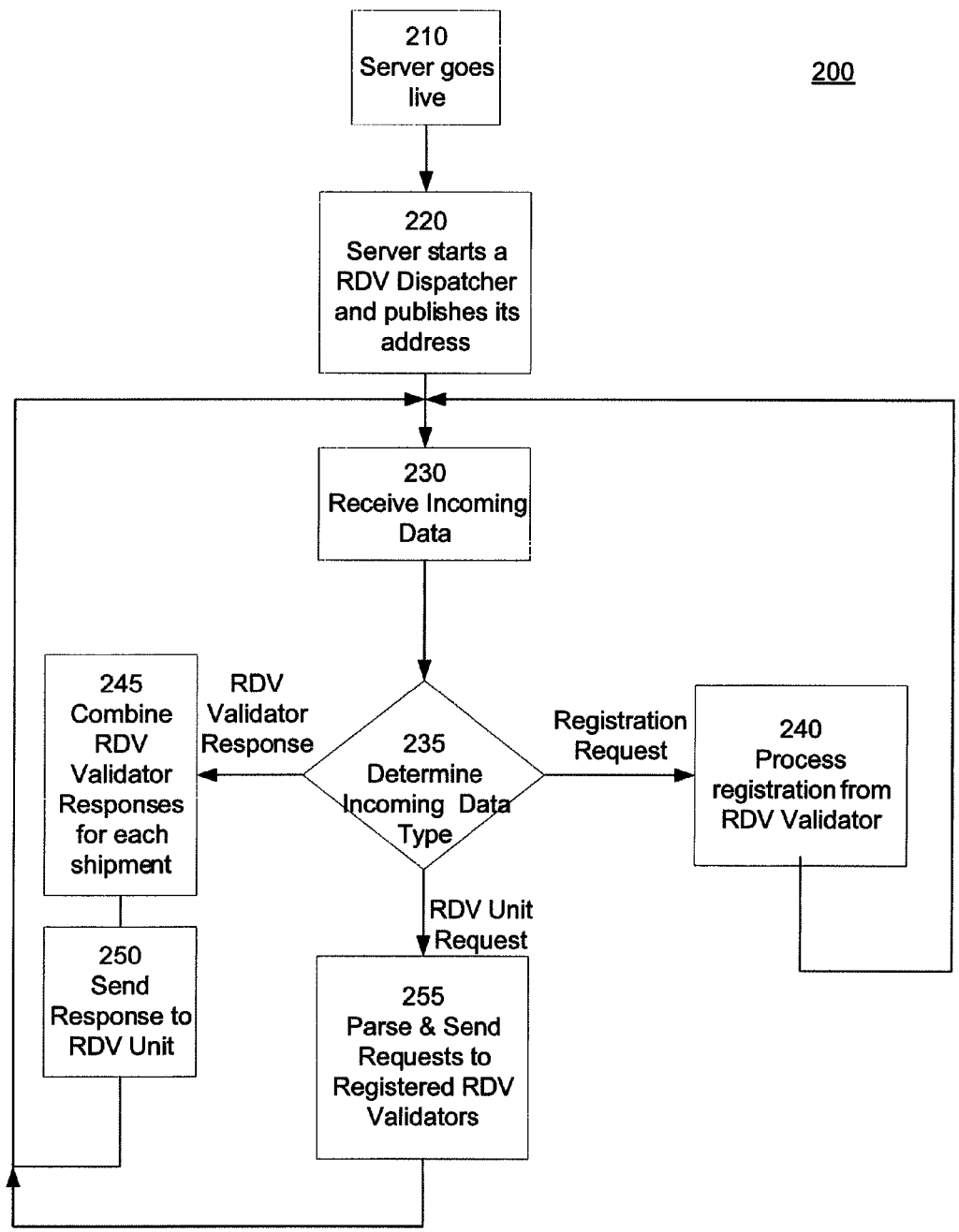
FIG. 2 illustrates a flowchart describing the deployment of the RDV Dispatcher according to some embodiments of the present invention.

FIG. 2 shows a flowchart 200 describing the deployment of the RDV Dispatcher. In step 210, a server, on which an RDV Dispatcher is installed, is booted up and connects to a network. In some embodiments consistent with the present invention, the server may be associated with a Law Enforcement Agency 120 and could be the exemplary server 125-1 of FIG. 1. In some embodiments consistent with the present invention, RDV Dispatcher could be the exemplary RDV Dispatcher 135 of FIG. 1. In step 220, the server starts the RDV Dispatcher and broadcasts the server's address over the network, which could be exemplary network 175 of FIG. 1. In some embodiments the address broadcast by the server could be the network address and port number where incoming RDV data will be accepted. Next, in step 230, the server receives incoming data. The incoming data is categorized in step 235. If the incoming data is categorized as a registration request from an RDV Validator, the registration is processed in step 240. In some embodiments processing may involve adding RDV Validator details to the server database, such as identifying information including a network address and port number. In general, the format and composition of the identification information may be based upon an established or agreed upon protocol between the RDV Dispatcher and RDV Validator. In some embodiments consistent with the present invention, the server database could be exemplary database 140-1 of FIG. 1. If the incoming data is categorized as an RDV Unit shipment validation request, it is parsed in step 255, to identify entities and corresponding RDV Validators associated with the shipment and to separate information in the received request into data fields. The format and composition of the data fields may be based upon an established or agreed upon protocol between the RDV Dispatcher and RDV Validator. One or more validation requests may then be sent to registered RDV Validators associated with the shipment. In some embodiments consistent with the present invention, an Unknown Entity Code may be generated, if entities associated with the shipment are not registered with the RDV Dispatcher and/or if they cannot be located in the RDV Dispatcher database. In some embodiments consistent with the present invention, the registered RDV Validators could be the exemplary RDV Validators 160-2 and 160-3 shown in FIG. 1. If the incoming data is categorized as an RDV Validator response, then the response is combined with other responses to validation requests for a given shipment in step 245. In step 250, the combined validation response is sent to the requesting RDV Unit. In some embodiments consistent with the present invention, the RDV Unit could be exemplary RDV Unit 115 of FIG. 1. The RDV Dispatcher then returns to step 230, where it awaits additional incoming data.

Figure 3:
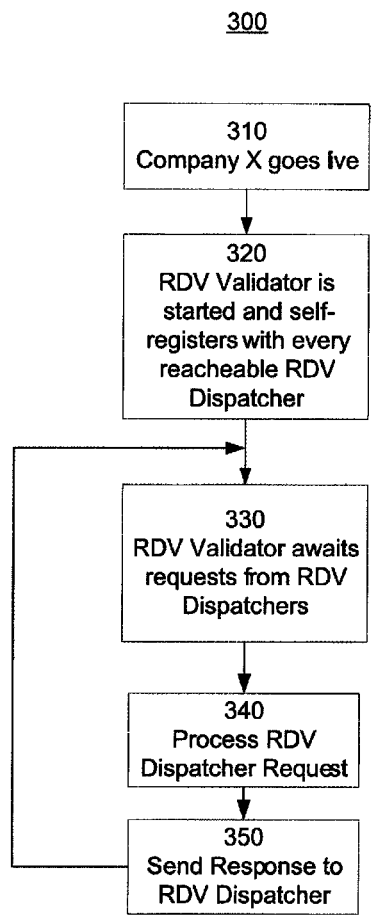
FIG. 3 shows a flowchart describing an exemplary system 300 for deployment of the RDV Validator according to some embodiments of the present invention.

FIG. 3 shows a flowchart describing a system 300 for deployment of the RDV Validator. In some embodiments, the RDV Validator could be either of the RDV Validators 160-2 or 160-3, as shown in FIG. 1. In step 310, a server, on which an RDV Validator is installed, is booted up and connects to a network, which could be exemplary network 175 shown in FIG. 1. In step 320, the RDV Validator is started and registers with every RDV Dispatcher available for registering. In one embodiment, information identifying RDV Company Dispatchers available for registration may be received over a network in response to a registration information request broadcast by RDV Validator. In one embodiment consistent with the present invention information about RDV Dispatchers available for registration may be retrieved from a file. In some embodiments, the RDV Dispatcher Modules available for registering could be additional instances of the exemplary RDV Dispatcher 135 of FIG. 1. Next, in step 330, the RDV Validator awaits incoming validation requests containing at least one item identifier and one shipment identifier. In some embodiments consistent with the present invention, a validation request could contain multiple data fields corresponding to various aspects of an item that require validation. For example, data fields may contain information identifying the shipment such as a shipment identifier and a physical location identifier, such as a highway number and mile stop. When shipment and item identifiers and physical location information reaches an RDV Validator at, for example, a trucking company, the identifiers can be used to look up and verify information regarding the shipment, as explained with respect to step 340 below. In general, the information in the data fields and the format of the data fields are not restricted by the example described above and may correspond to any protocol established between the RDV Dispatchers and RDV Validators for generating and validating RDV requests.

In step 340, any validation requests received from RDV Dispatcher Modules are processed by querying a database such as the exemplary database 140-3 of FIG. 1 and comparing information stored in database 140-3 with information in the received validation request. In the trucking company example described above, information such as the next destination of the shipment and the normal routes used by the trucking company for shipments to that destination can be correlated with the physical location identifier and any deviations flagged. In some embodiments consistent with the present invention, some or all of the information in the data fields in a validation request may need to be compared with information stored in the database associated with the RDV Validator. For example, information in data fields in a validation request could be used by RDV Validators 165 and 165-3 to generate queries to exemplary databases 140-2 and 140-3 respectively. In some embodiments consistent with the present invention, a single validation request may require the RDV Validator to generate multiple database queries to validate the information contained in some or all of the data fields. A response is returned in step 350 based on the results obtained in step 340. For example, a code indicating a data match may be generated when the information contained in a data field matches information in the database. In the trucking company example above, a match could be generated if the highway number and mile stop fall within the normal route followed by company trucks to the shipment destination. Conversely, a code indicating data mismatch may be generated when the information contained in a data field does not match information contained in the database. If the database has insufficient data to validate some of the information contained in the validation request, then a code indicating insufficient data may be generated. For example, a destination may not routinely be served by a trucking company so that no route information pertaining to that destination may exist in the Company Validator database. In such instances, a code indicating insufficient data may be generated. Thus, it may not be possible to correlate the physical location of the shipment with information available to the trucking Company Validator. The responses to a validation request may be as simple as a "Yes," "No," or "Maybe," or they may derived from parameters or rules stored in a "rule base" that determine how the data retrieved in response to the validation request should be processed. For instance, in the trucking company example described above, a rule may be set to generate a response indicating a route-physical location mismatch only when the physical location of the shipment deviates from the normal route by over 50 miles. In some embodiments consistent with the present invention, the codes generated as a result of the various queries may be combined into a response or return code before being sent to an RDV Dispatcher. The RDV Validator then returns to step 330, where it awaits additional incoming requests.

Figure 4:
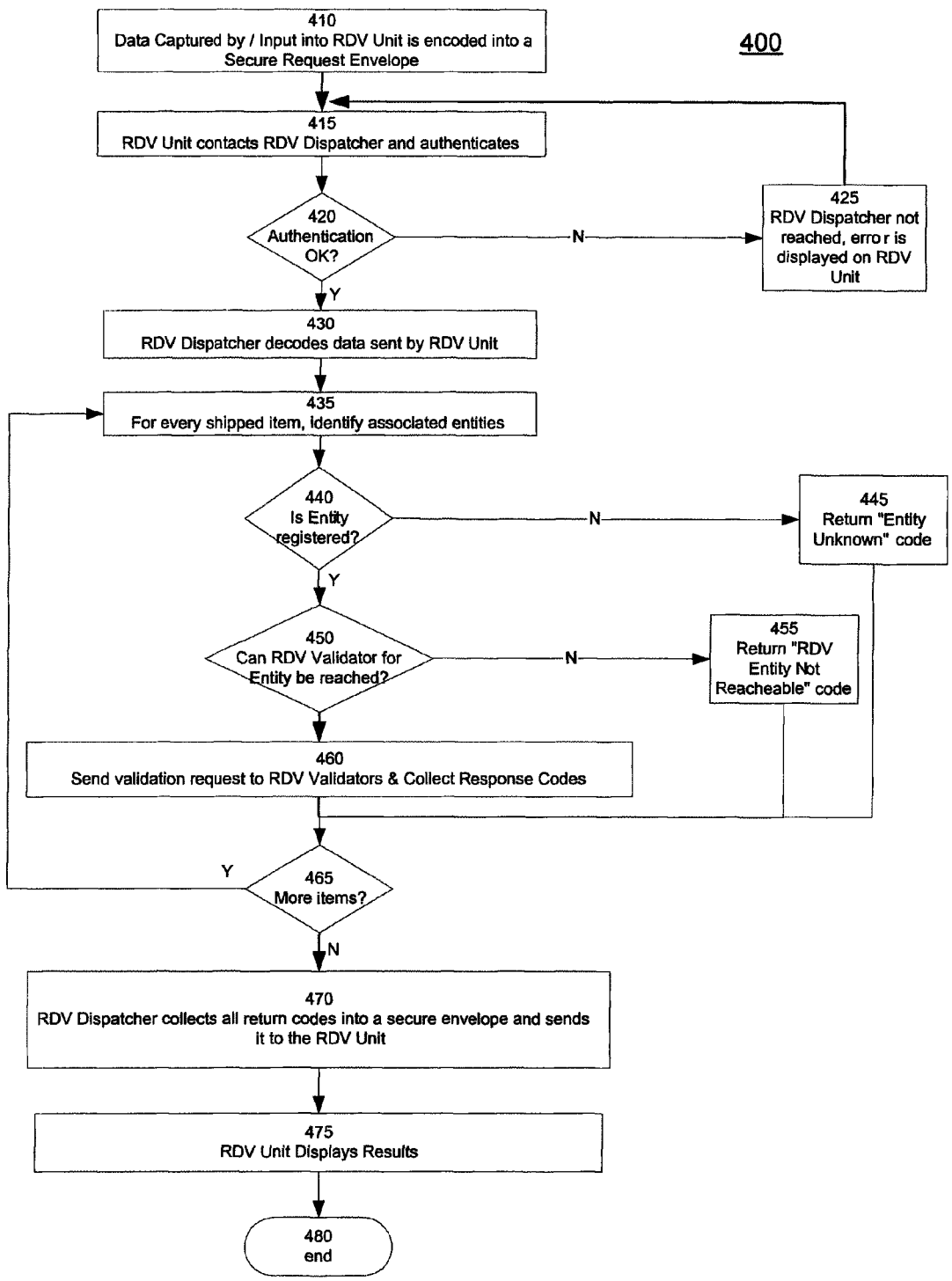
FIG. 4 shows a flowchart that traces the process flow for a remote validation request according to some embodiments of the present invention.

FIG. 4 shows a flowchart 400 that traces the process flow for a remote validation request. In step 410, data that is captured (captured or entered) in an RDV Unit, such as the exemplary RDV Unit 115 shown in FIG. 1, is encoded into a secure request envelope. For example, the data could be the shipment identifier and/or the physical location identifier of a shipment. The secure request envelope allows the encapsulated data being transmitted to be protected from eavesdropping or alteration while in transit. Next, in step 415, the RDV Unit attempts to contact an RDV Dispatcher and exchange authentication information. In some embodiments consistent with the present invention, the RDV Dispatcher could be exemplary RDV Dispatcher 135 of FIG. 1. The authentication procedure ensures that both the RDV Unit and the RDV Dispatcher are part of the same validation network. For example, on one hand authentication ensures that unauthenticated RDV Units will not be able to receive confidential information contained in a response to a validation request regarding a shipment. On the other hand, authentication ensures that only authenticated RDV Dispatchers receive a validation request sent by a RDV Unit. The result of the authentication process is evaluated in step 420. If the authentication has failed, an error is returned in step 425 and the authentication process must be retried. In some embodiments consistent with the present invention, an RDV Unit or an RDV Dispatcher may be locked-out or blocked if there are repeated authentication failures. If the authentication is successful, the data sent by the RDV Unit is decoded by the RDV Dispatcher, in step 430. Next, in step 435, the RDV Dispatcher identifies the entities associated with a shipment. For example, information about the entities may be retrieved by querying a database, such as the exemplary database 140-1 shown in FIG. 1. These entities could include, for example, the manufacturer of a shipment, the trucking company, or other carrier transporting the shipment, or a trans-shipment warehousing company. A determination about the registration status of the entities associated with a shipment is made in step 440. If the entities are not registered or are not found in the database then an "Unknown Entity" code may be sent to the RDV Unit in step 445. If the entity is registered, the RDV Dispatcher attempts to contact the RDV Validator associated with the entity using contact information stored in the database. For example, these could be the RDV Validator Modules 160-1 or 160-2 associated with Vendor 150 or Shipping Company 180 respectively, as shown in FIG. 1. In step 450, the result of attempts to reach RDV Validators is recorded. For RDV Validators that can be reached, a validation request is sent out by the RDV Dispatcher and responses to these validation requests received from the RDV Validators are collected in step 460. If an RDV Validator is unreachable an "Entity Unreachable" code is generated in step 455. In step 465, the RDV Dispatcher uses the information received from the RDV Unit to determine if there are additional items related to the shipment that need to be processed. If additional items remain, the RDV Dispatcher returns to step 435. If all items have been processed then, in step 470, the RDV Dispatcher assembles and encodes all the return codes received from the RDV Validators related to a shipment into a secure envelope and sends these to the requesting RDV Unit in step 470. The RDV Unit then displays the received codes to the operator in step 475.

Further, methods consistent with embodiments of the invention may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention and, therefore, no detailed computer program could be provided that would be applicable to these many different systems. Each user of a particular computer will be aware of the language, hardware, and tools that are most useful for that user's needs and purposes.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the necessary functionality. The processes disclosed herein are not inherently related to any particular computer or other apparatus, and aspects of these processes may be implemented by any suitable combination of hardware, software, and/or firmware. For example, various general-purpose machines may be used with programs written in accordance with teachings of the invention, or it may be more convenient to construct a specialized apparatus or system to perform the required methods and techniques.

Embodiments of the present invention also relate to compute-readable media that include program instructions or program code for performing various computer-implemented operations based on the methods and processes of embodiments of the invention. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of The invention being indicated by the following claims. As such, the invention is limited only by the following claims.

The invention claimed is:

1. A computer-implemented method of deploying a validation system for remotely validating shipment data, the method comprising:
deploying via a computer server at least one dispatcher capable of communicating with at least one data capture unit and at least one validator to:
receive the shipment data captured by the at least one data capture unit at an inspection point along a route, wherein the captured shipment data is related to an item being shipped, the shipment data comprising an item identifier of the item in the shipment and the at least one validator's identifier;
request validation of the captured shipment data from the at least one validator, wherein the validation request is orginated from the at least one data capture unit;
obtain a response to the validation request from the at least one validator, wherein the response is generated by the at least one validator based on a comparison between the validation request and additional shipment information retrieved from at least one validator based on the captured shipment data; and
send the generated response to the at least one data capture unit for displaying and/or storing.

2. The computer-implemented method of claim 1, wherein deploying via a computer server the at least one dispatcher capable of communicating with at least one data capture unit and at least one validator further comprises:
starting via the computer server the at least one dispatcher;
broadcasting information identifying the at least one dispatcher;
receiving incoming requests; and
processing the incoming requests.

3. The computer-implemented method of claim 2, wherein broadcasting information identifying the at least one dispatcher includes information to enable communication with the at least one dispatcher.

4. The computer-implemented method of claim 2, wherein broadcasting information identifying the at least one dispatcher includes network address and/or port information for communication with the at least one dispatcher.

5. The computer-implemented method of claim 2, wherein processing the incoming requests further comprises one or more of the steps of:
processing data capture unit registration requests;
processing validator registration requests;
processing validation requests; and
processing validation responses.

6. The computer-implemented method of claim 5, wherein processing data capture unit registration requests comprises:
identifying the at least one data capture unit requesting registration;
authenticating the registration request;
adding at least one identifier corresponding to the at least one data capture unit to a database upon determining that the registration request is authenticated; and
returning an error upon determining that the registration request is not authenticated.

7. The computer-implemented method of claim 6, wherein adding at least one identifier corresponding to the at least one data capture unit to a database further includes adding network address and/or port information for communication with the at least one data capture unit to the database.

8. The computer-implemented method of claim 5 wherein processing validator registration requests comprises:
identifying the validator requesting registration;
authenticating the registration request;
adding at least one identifier corresponding to the at least one validator to a database upon determining that the registration request is authenticated; and
returning an error upon determining that the registration request is not authenticated.

9. The computer-implemented method of claim 8, wherein adding at least one identifier corresponding to the at least one validator to a database further includes adding a network address and/or port information for communication with the at least one validator to the database.

10. The computer-implemented method of claim 5, wherein processing validation requests comprises:
identifying the at least one data capture unit requesting validation of captured shipment data wherein the shipment data includes at least one item identifier of an item in the shipment and at least one previous handler's identifier of the item;
authenticating the validation request;
retrieving validator information from a database corresponding to the at least one previous handler's identifier contained in the validation request upon determining that the validation request is authentic;
transmitting the validation request to retrieved validators corresponding to the at least one previous handler's identifier upon determining that the validation request is authentic; and
returning an error to the at least one data capture unit upon determining that the validation request is not authenticated.

11. The computer-implemented method of claim 5, wherein processing validation responses comprises:
receiving validation responses from individual validators in response to a previously transmitted validation request; and
combining the validation responses associated with a specific validation request from a data capture unit into a combined validation response;
transmitting the combined validation response to the data capture unit.

12. A computer-implemented method of deploying a validation system for remotely validating shipment data, the method comprising:
deploying via a computer at an inspection point along a route the at least one data capture unit capable of communicating with at least one dispatcher to:
capture the shipment data related to an item being shipped, the shipment data comprising an item identifier of the item in the shipment and the at least one validator's identifier;
request validation of the captured shipment data from at least one validator via the at least one dispatcher, wherein the validation request comprises at least one data field corresponding to at least one aspect of the item being shipped;
receive a response to the validation request from the at least one validator via the at least one dispatcher, wherein the response is generated by the at least one validator based on a comparison between the validation request and additional shipment information retrieved from the at least one validator based on the captured shipment data; and
display and/or store the received response.

13. The computer-implemented method of claim 12, wherein deploying via a computer at an inspection point along a route the at least one data capture unit capable of communicating with the at least one dispatcher comprises:
    starting via the computer the at least one data capture unit;
    broadcasting data capture unit identification information;
    receiving dispatcher information in response to the broadcast data capture unit identification information;
    registering with the at least one dispatcher; and
    storing the received dispatcher information.

14. The computer-implemented method of claim 13, wherein the data capture unit identification information includes information needed to communicate with the at least one data capture unit.

15. The computer-implemented method of claim 14, wherein information needed to communicate with the at least one data capture unit includes network address and/or port information.

16. A computer-implemented method of deploying a validation system for remotely validating shipment data, the method comprising:
    deploying via a computer server at least one validator capable of communicating with at least one dispatcher to:
        receive from the at least one dispatcher a remote validation request of the shipment data captured by at least one data capture unit at an inspection point along a route, wherein the captured shipment data is related to an item being shipped and comprises at least one item identifier of the item in the shipment and the at least one validator's identifier, the at least one dispatcher is operatively coupled to the at least one validator, and the validation request is originated from the at least one data capture unit and comprises at least one data field corresponding to at least one aspect of the item being shipped;
        retrieve additional shipment information of the item based on the captured shipment data;
        generate a response to the remote validation request based on a comparison between the retrieved additional shipment information and the remote validation request; and
        send, via the at least one dispatcher, the generated response to the at least one data capture unit for displaying and/or storing.

17. The computer-implemented method of claim 16, wherein deploying via a computer server at least one validator capable of communicating with the at least one dispatcher comprises:
    broadcasting via the computer server validator identification information;
    receiving dispatcher information in response to the broadcast validator module identification information;
    registering with the at least dispatcher; and
    storing the received dispatcher information.

18. The computer-implemented method of claim 17, wherein the validator identification information includes information needed to communicate with the at least one validator.

19. The computer-implemented method of claim 18, wherein information needed to communicate with the at least one validator includes network address and/or port information.

20. The computer-implemented method of claim 1, wherein the at least one validator is a previous handler of the item being shipped.

\* \* \* \* \*